(12) United States Patent
Garcia, Jr.

(10) Patent No.: US 7,837,151 B1
(45) Date of Patent: *Nov. 23, 2010

(54) METHOD AND APPARATUS FOR THE HOOKUP OF UNMANNED/MANNED ("HUM") MULTI PURPOSE AIR VEHICLES WITH EACH OTHER

(75) Inventor: Frank Garcia, Jr., Walnut, CA (US)

(73) Assignee: Sargent Fletcher, Inc., El Monte, CA (US)

( * ) Notice: Subject to any disclaimer, the term of this patent is extended or adjusted under 35 U.S.C. 154(b) by 1011 days.

This patent is subject to a terminal disclaimer.

(21) Appl. No.: 11/523,175

(22) Filed: Sep. 18, 2006

Related U.S. Application Data

(63) Continuation-in-part of application No. 10/701,209, filed on Nov. 1, 2003, now Pat. No. 7,152,828.

(51) Int. Cl.
*B64D 39/00* (2006.01)
(52) U.S. Cl. .............................. 244/135 A; 244/135 R
(58) Field of Classification Search ............ 244/135 A, 244/135 R, 172.4; 701/3
See application file for complete search history.

(56) References Cited

U.S. PATENT DOCUMENTS

| 2,879,016 | A | * | 3/1959 | Haase | .................... 244/135 A |
|---|---|---|---|---|---|
| 2,946,543 | A | | 7/1960 | Gordon et al. | |
| 3,067,972 | A | * | 12/1962 | Mosher | .................. 244/135 A |
| 3,091,419 | A | * | 5/1963 | Mosher | .................. 244/135 A |
| 4,072,283 | A | * | 2/1978 | Weiland | .................. 244/135 A |
| 5,326,052 | A | | 7/1994 | Krispen et al. | |
| 5,906,336 | A | * | 5/1999 | Eckstein | .................. 244/135 A |
| 6,266,142 | B1 | * | 7/2001 | Junkins et al. | .............. 356/623 |
| 7,093,801 | B2 | * | 8/2006 | Schroeder | ............... 244/135 A |
| 7,137,598 | B2 | * | 11/2006 | Von Thal | ................. 244/135 A |
| 7,152,828 | B1 | * | 12/2006 | Garcia et al. | ............ 244/135 A |

* cited by examiner

*Primary Examiner*—Christopher P Ellis
(74) *Attorney, Agent, or Firm*—Woods Oviatt Gilman LLP

(57) ABSTRACT

A system for the hookup of either a manned or unmanned air vehicle with a refueling air vehicle. A probe extending from an air vehicle being refueled is joined to a drogue at the end of a boom on a refueling air vehicle. In bringing the probe into the drogue an optical sensor on one of the vehicles is employed in conjunction with optical beacons on the other vehicle with the sensor measuring the relative motion between the probe and the drogue and generating a control signal for controlling motion of the probe relative to the drogue. The positioning of the probe relative to the drogue is accurately controlled during the fueling operation by a rigid actuator mechanism formed by a rod sidably fitted within a sleeve, the rod being driven by a tensioned reel in response to control signals. One end of the actuator is connected to the drogue while the other end is connected to the refueling aircraft to form a triangular configuration, allowing only small interaction forces thereby restraining relative motion between the probe and the drogue.

14 Claims, 4 Drawing Sheets

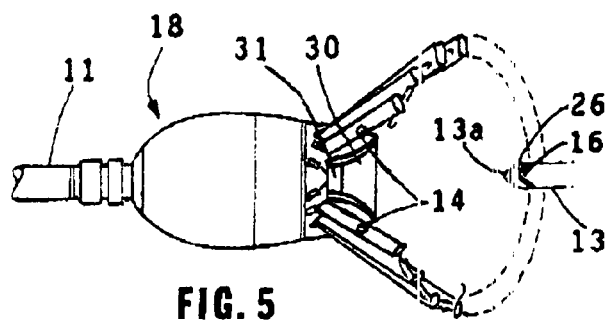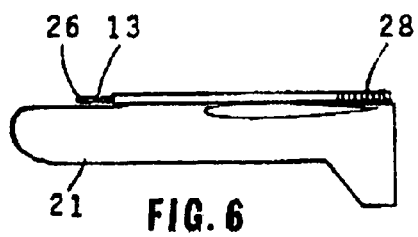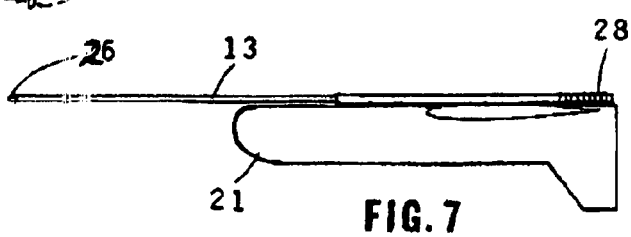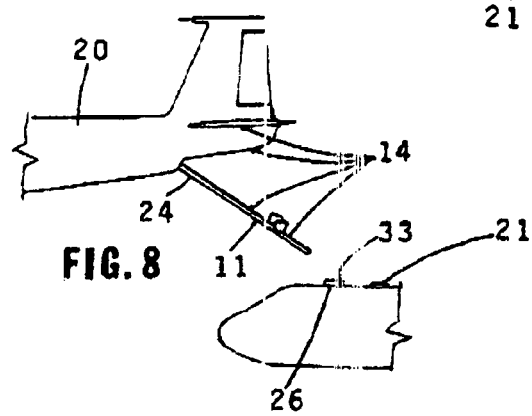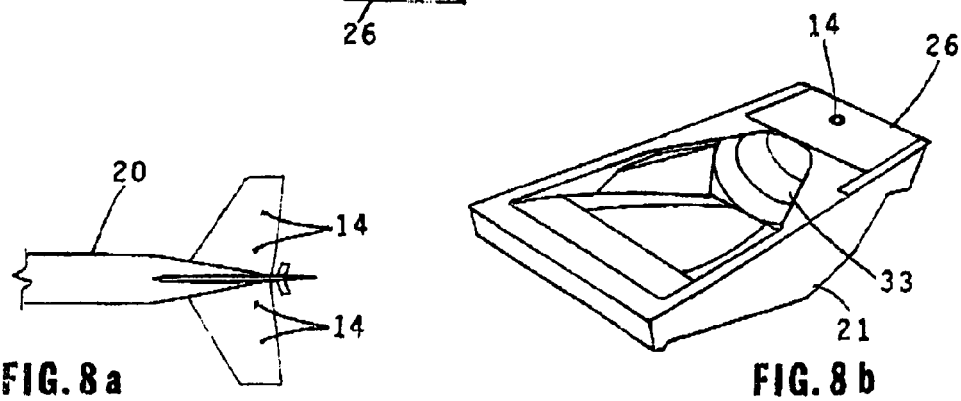

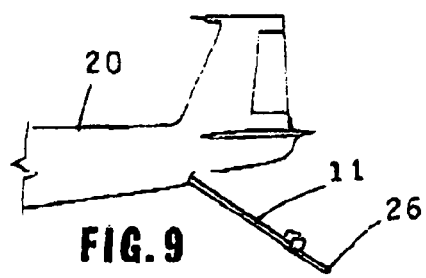
FIG. 9
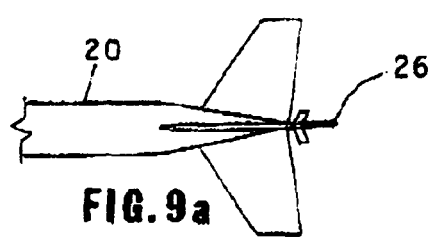
FIG. 9a
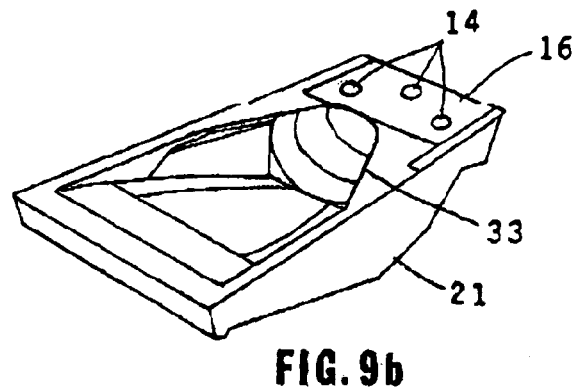
FIG. 9b
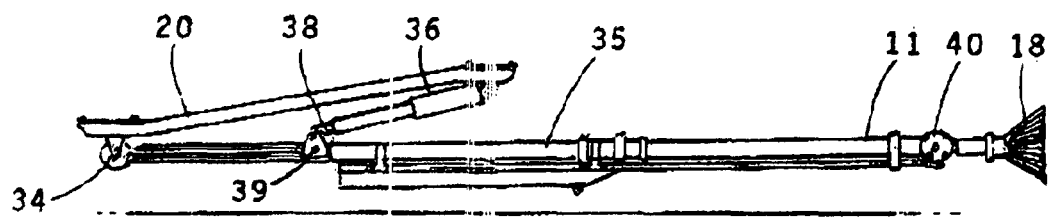
FIG. 10
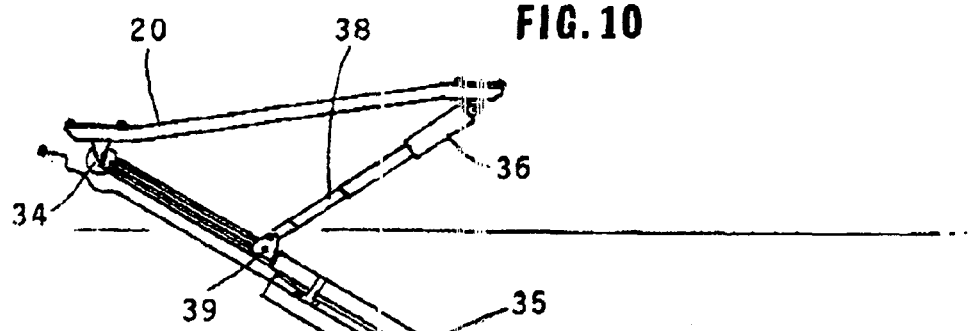
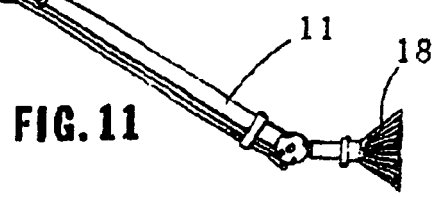
FIG. 11

METHOD AND APPARATUS FOR THE HOOKUP OF UNMANNED/MANNED ("HUM") MULTI PURPOSE AIR VEHICLES WITH EACH OTHER

This application is a Continuation in Part of my application Ser. No. 10/701,209 filed on Nov. 1, 2003 now U.S. Pat. No. 7,152,828.

BACKGROUND OF THE INVENTION

1. Field of the Invention

This invention relates to the hookup between multipurpose air vehicles which may be either manned or unmanned and more particularly to such a hookup for the purpose of refueling one of said air vehicles from the other.

2. Description of the Related Art

The capability of continuous operation of unmanned air vehicles ("UAVs") is limited by their onboard fuel capacity. The desired capability for continuous operation 24 hours a day every day of the week of such air vehicles, which are limited by their fixed onboard fuel capacity raises a need to routinely air-refuel these vehicles. This in turn gives rise to the need for integrating a high precision navigation technology with an appropriately designed aerial refueling system which is compatible with the navigation system. A typical airborne refueling system is described in U.S. Pat. No. 5,326,052 issued Jul. 5, 1994 to Krispin et al. Such systems often employ hose and drogue connections between the fueling aircraft and the aircraft being fueled. To connect the hose to the drogue requires a control system such as described in U.S. Pat. No. 6,266,142 issued Jul. 24, 2001 to Junkins, et al., U.S. Pat. No. 5,326, 052 issued Jul. 5, 1994 to Krispin et al., and U.S. Pat. No. 5,530,650 issued Jun. 25, 1996 to Biferno, et al.

The provision of regular refueling of unmanned aircraft requires a precision navigation system which is integrated with the refueling system. Prior art systems have shortcomings in that they fail to provide the combination of a precision navigation system with a precision refueling system with the accuracy and reliability to be desired. These shortcomings lie particularly in the design of the probe on the aircraft being refueled and the drogue on the refueling aircraft where the coupling between these elements and the reliable and firm retention of these two units to each other is essential for proper operation. In addition, when the probe is being brought into contact with the drogue, it is important that there be good control of the movement of the probe so that it does not improperly strike against either aircraft and that the probe stays properly positioned within the drogue.

SUMMARY OF THE INVENTION

The present invention employs a refueling system boom on the refueling aircraft which includes a drogue and a probe on the vehicle being refueled. Beacons mounted on both vehicles generate signals measuring movement between the two vehicles.

An optical sensor system known as VisNav, operating in conjunction with the optical beacons measures the relative motion between the refueling probe on the aircraft being refueled and the drogue attached to the boom on the refueling aircraft. These measurements include relative position, velocity, acceleration, attitude, and the measurement of the relative motion of the universal aerial refuel receptacle slipway installation (UARRS) relative to the refueling probe of the vehicle being refueled. Such a system is shown in FIGS. 1 and 2 and is described in U.S. Pat. No. 6,266,142 issued Jul. 24, 2001 to Junkins et al., particularly in connection with FIG. 18 of this patent. In the present invention, this prior art system is combined with a highly accurate actuator and control system for controlling the positioning of the boom relative to the drogue and the probe's entry therein. In addition, the positioning of the probe within the drogue is accurately controlled during the refueling operation by the actuator, which is reeled in response to its control system so as to restrain relative motion between the probe and drogue with small interaction forces there between. The actuator is formed with a rod which is slidably supported within a sleeve, the motion of the rod being controlled by the reel.

This operation of the device of the invention is enhanced by the use of the reeled actuator mechanism which runs between a reel on the refueling aircraft and a compliant joint on the boom to form a triangular configuration with the boom and the body of the refueling aircraft. The reel mechanism is tensioned in response to control signals to take up any slack in the support of the boom. The compliant joint, together with the triangular arrangement formed with the actuator, has small interaction forces yet restrains relative motion between the probe and the drogue during refueling operations.

It is therefore an object of this invention to provide an improved aircraft refueling system particularly suited for refueling unmanned airborne vehicles;

It is a further object of this invention to improve the control of the refueling of an airborne vehicle;

It is still a further object of this invention to provide improved control of the motion between the probe of a refueling airborne vehicle and an airborne vehicle being refueled;

Other objects of the invention will become apparent in view of the following description taken in connection with the accompanying drawings.

DESCRIPTION OF THE DRAWINGS

FIG. 5 is a side elevational view of a collapsible drogue used in the first embodiment;

FIG. 6 is a side elevational view of the probe tip of the first embodiment retracted before engagement with the drogue;

FIG. 7 is a side elevational view of the probe of the first embodiment in its extended position for engagement with the drogue;

FIG. 8 is a side view of a second embodiment of the invention;

FIG. 8A is a top plan view of the second embodiment;

FIG. 8B is a top perspective view of the refueling receptacle and VisNav sensor of the embodiment of FIG. 8.

FIG. 9 is a side elevational view of a third embodiment of the invention;

FIG. 9A is a top plan view of the refueling aircraft of the third embodiment;

FIG. 9B is a top perspective view of the refueling receptacle of the third embodiment;

FIG. 10 is a side elevational view of a fourth embodiment of the invention having a mechanism for extending the boom from the refueling aircraft;

FIG. 11 is a side elevational view of the fourth embodiment with the boom of the refueling aircraft extended;

DETAILED DESCRIPTION OF THE INVENTION

Figure 1:
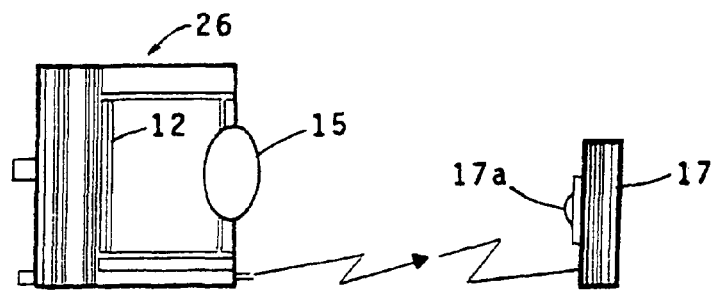
FIG. 1 is a schematic drawing illustration of a prior art aerial hookup for a aircraft refueling system.
Figure 2:
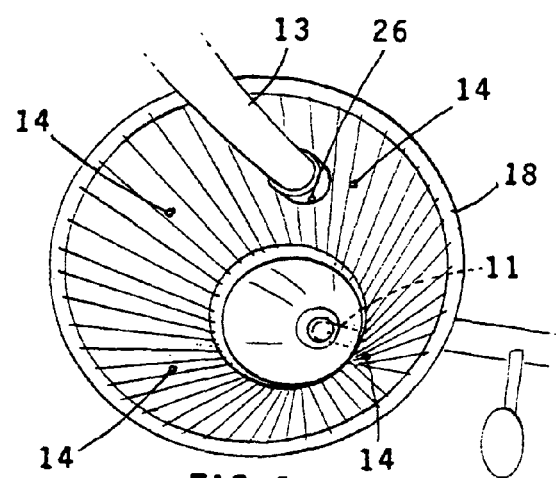
FIG. 2 is a front perspective view of a prior art probe and drogue aerial refueling system.

Referring to FIGS. 1 and 2, a precision navigation system of the prior art employing a drogue 18 on the end of the boom 11 of a refueling aircraft and a probe 13 on the aircraft being refueled, are illustrated. The prior art navigation system is known as VisNav and is illustrated in FIG. 1 and described in U.S. Pat. No. 6,266,142 issued to Junkins, et al on Jul. 24, 2001. This precision navigation system functions to determine the relative position between the probe 13 of the vehicle being refueled and the drogue 18 of the refueling vehicle. The VisNav optical sensor 26 is mounted on the end of the probe 13 of the vehicle being refueled. As shown in FIG. 1, the optical sensor has a position sensor 12 positioned in the focal plane of the photo detector of the sensor which measures the centroid location of the structured light focused on the detector by fisheye lens 15 from one of several (at least 4) beacons 14 on the drogue. Beacons 14 are modulated with a known waveform (e.g. a sine wave at a frequency of 40,000 cps) such that a matched filter in the VisNav sensor will reject ambient energy which is not at the frequency of the beacons.

A radio communications system 17 communicates with omni-directional light source 17a and adjusts its light output which is received by the beacons to control the beacon outputs. In this manner, the energy received from each beacon is optimized to provide a maximum signal to noise ratio for each line of sight measurement. This feature combined with the fisheye optics provided by lens 15 assures that the range between the vehicle being refueled and the refueling vehicle can vary widely while still maintaining the received optical energy focused on the position sensor 12 with an optimum signal to noise ratio. A navigation algorithm is utilized in the line of sight measurements to determine the x, y, and z linear displacements of the center of the drogue 18 (a target point in the micro-coupling system) relative to a coordinate system fixed in the fuel receiving vehicle. Further, output from the navigation algorithm are the roll (phi), pitch (theta), and yaw (psi) angles which give the angular displacement between the axis of the vehicle being refueled from its target position fixed in the drogue.

Figure 3:
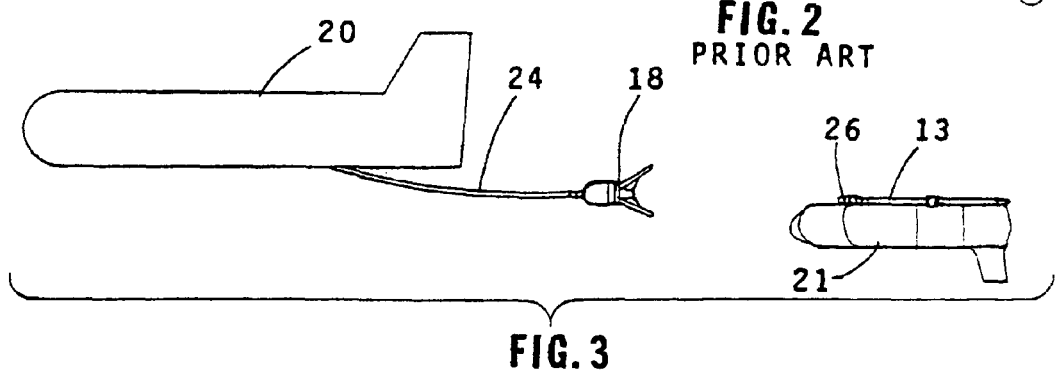
FIG. 3 is a schematic drawing of a first embodiment of the invention suitable for use refueling small air vehicles.
Figure 4:
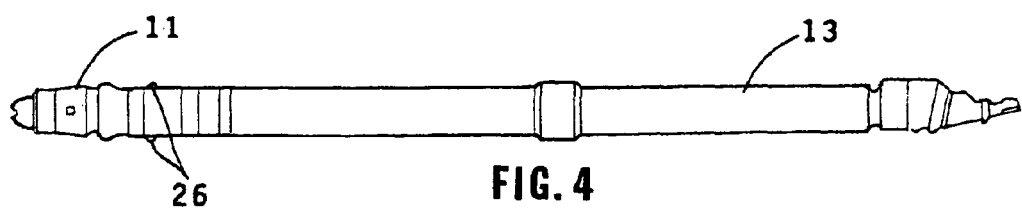
FIG. 4 is a side elevational view of a retractable probe utilized in the first embodiment.
Figure 12:
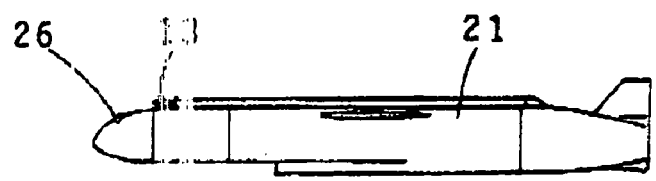
FIG. 12 is a side elevational view of the fourth embodiment with the probe of the aircraft being refueled retracted.
Figure 13:
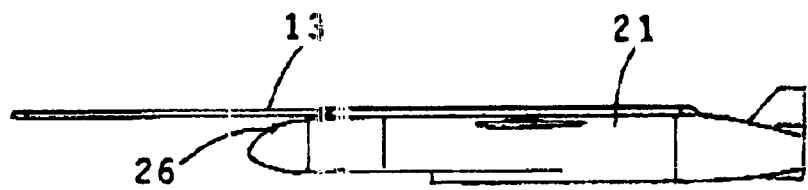
FIG. 13 is a side elevational view of the fourth embodiment showing the probe of the aircraft being refueled extended.

Referring now to FIGS. 3-7, the probe 13 of the vehicle being refueled and the micro-adapter coupling of an embodiment of the invention for use in small vehicles are illustrated. The probe 13 is shown retracted in FIGS. 3 and 6 and in an extended position in FIG. 7. Drogue 18 into which the probe 13 is inserted and which connects to the fueling boom 11 and from there to hose 24 is illustrated in FIGS. 3 and 5. The position and orientation errors(x, y, z, phi, theta, and psi) and their rates are determined by the VisNav measurements detected by VisNav sensors 26 on probe 13 and the navigation algorithm. These signals are used by the control system on the vehicle being refueled to drive the position and orientation errors towards zero at a rate consistent with safe operations. When these errors are near zero, the probe 13 drives spring 28 to the extended position as shown in FIG. 7 from its at rest position as shown in FIG. 6, which in turn drives the coupling mechanism 31 of the drogue 18 which trigger locks onto the collar 16 of the probe and initiates fuel flow. The fuel flow causes the clamping force to greatly increase to ensure a tight coupling of the probe to the fuel coupling mechanism.

More specifically, referring to FIG. 5, as the probe 13 enters the adapter 30 of drogue 18, the probe tip 13a encounters the coupling mechanism of the drogue 31 which includes a soft spring loaded mechanism and initiates depression of the spring. At a critical level of depression, fuel flow initiates the locking of the adapter onto the collar 16 of the the probe, to ensure tight coupling. The fuel tank of the vehicle being refueled fills and is equipped with a fuel gauge. Upon approaching completion of the fueling operation, the fuel gauge triggers telemetry to provide a signal to a receiver in the fueling vehicle that causes shut down of the fuel pump. Upon shutdown, the reduced pressure permits the clamp on adapter 30 to release from collar 16 and allows the probe 13 to be withdrawn from the drogue 18 with near zero force on the probe. As a consequence, the control system of the vehicle being refueled can decelerate this vehicle and rapidly withdraw the probe from the coupling mechanism and drogue of the refueling vehicle. During withdrawal, the VisNav system measures the relative motion so that the controller can employ the measured position relative to the paradrogue to avoid collision of the probe with the drogue. Drogue deployment before refueling and retrieval after completion of refueling follows well established patterns and can be commanded by controllers in either the refueling vehicle or the vehicle being refueled.

It is to be noted that a system other than VisNav could be used to measure the position of the paradrogue relative to the vehicle being refueled. Instead of centroiding optical energy from a light emitting diode, microwave energy from suitable emitters and an appropriate microwave detector system for detecting this energy can be employed. Such a microwave system can use the same basic operation system as VisNav except for the details of the energy beacons and the detector which centroids this energy. Another alternative would be to employ digital camera technology. The beacon energy can be adjusted to optimize the centroiding accuracy of each beacon image on the detector. Pattern recognition can be employed to identify the measured images. Due to limitations of frame rate, (typically less than 200 Hz), such an embodiment will not be able to make use of high frequency modulation(e.g. 40 KHz) of the beacon energy as in the embodiments previously described.

Referring now to FIGS. 8, 8A and 8B, a second embodiment of the invention is illustrated. The VisNav sensor 26 is positioned on the air vehicle being refueled 21. The VisNav "SmartLites" 14 are mounted on the refueling vehicle 20 and on the vehicle being refueled 21 adjacent to the universal aerial refuel receptacle slipway installation 33 (UARRSI). This location is on the underside of both horizontal tails, the underside of the fuselage and tail cone and the refueling boom 11. In operation, the VisNav sensor 26 mounted on the vehicle being refueled 21 detects the SmartLite transmissions and a navigation solution is calculated such that the vehicle being refueled is controlled to connect with the drogue 18 and receive the transfer of fuel as in the previous embodiments. However, the beacon energy can be adjusted to optimize the centroidal accuracy of each beacon image on the detector. Pattern recognition is required to identify the images.

Referring now to FIGS. 9, 9A, AND 9b, a further embodiment of the invention is illustrated. This embodiment is similar to the embodiment of FIG. 8 except that the SmartLite Beacons 14 are all mounted on the vehicle being refueled 21. As for the previous embodiment, the VisNav sensors 26 are mounted on the refueling vehicle 20 at the tip of the refueling boom. Operation is basically the same as for the previous embodiment.

Referring no to FIGS. 10-14, a further embodiment of the invention which employs a unique triangular shaped hinged boom/receptacle deployed from the refueling aircraft is illustrated. This is a unique low speed lightweight boom and drogue system the approach navigation problems and maintain conatrol of rotating relative position during refueling.

The universal coupling joint 34 and the universal joint of the actuator 36 on the refueling aircraft permits compliance of the system so that lateral movement caused by forces between the tip of the boom of the aircraft being refueled and the receptacle is absorbed by the triangular deployment slider joint and the tensioned reel mechanism which takes up slack in the actuator. This results in low forces on he components of the system. Also the compliant hinge 39 on the receptacle of the boom 11 has a relatively low resistive moment, which coupled with the triangular configuration results in small interactive forces and yet effectively restrains relative motion during refueling.

Figure 14:
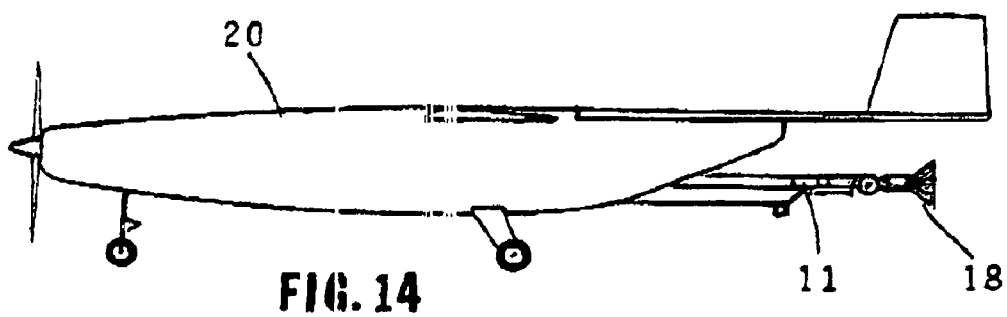
FIG. 14 is a side elevational view of a refueling aircraft with its boom and drogue retracted.

FIG. 14 shows the refueling aircraft 20 in flight with its boom 11 and drogue 18 retracted prior to the commencement of the refueling operation.

Thus, the device of the invention provides precise motion measurements in bringing the probe or boom of the aircraft being refueled into the drogue of the refueling aircraft and to maintain proper retention during refueling. This end result is achieved by means of beacons on one of the aircraft which are operated at a pre-selected frequency and which are activated by and operate in conjunction with a VisNav sensor and actuator.

I claim:

1. In a system for refueling a first airborne vehicle from a second airborne vehicle, said system including a probe mounted on said first vehicle and a drogue mounted on a boom connected to said second vehicle, said probe being connectable to said drogue for feeding fuel from said first vehicle to said second vehicle comprising:
   at least one beacon for generating a beam mounted on one of said vehicles;
   a detector mounted on the other of said vehicles for detecting said at least one beacon and generating a signal in accordance with the relative motion between the probe and the drogue;
   a mechanism operable to respond to said signal by controlling the relative motion between said probe of the first vehicle and said drogue, said mechanism comprising a tensioned reel connected between said second vehicle body and said boom, and an actuator member extending between the body of said second vehicle and said boom, said actuator member, said tensioned reel, said boom and said second vehicle body forming a triangle.

2. The system of claim 1 wherein said actuator is rigid.

3. The system of claim 1 wherein said actuator comprises a rod slidably mounted within a sleeve and said tensioned reel, the motion of said reel being responsive to said signal generated by said detector.

4. The system of claim 1 wherein said beam is an optical beam and said detector is an optical sensor.

5. The system of claim 4 wherein said optical sensor is a VisNav sensor.

6. The system of claim 1 and further comprising a universal mount on said first vehicle, said probe being mounted on said universal mount.

7. The system of claim 1 and further including a universal joint joining said actuator member to said boom.

8. A system for refueling a first airborne vehicle from a second airborne vehicle, said system including a probe mounted on said first vehicle and a boom mounted on said second vehicle, said boom having a drogue mounted on the end thereof, said probe being connectable to said drogue to allow fuel to be fed from said second vehicle to said first vehicle from said boom to said probe comprising:
   at least one beacon mounted on one of said vehicles for generating an optical beam
   a detector mounted on the other of said vehicles for receiving said beam and measuring and emitting an output signal indicative of the relative motion between said probe and said boom; and
   a control system for controlling the relative motion between said boom and said probe in response to said output signal of said detector when the probe is connected to the drogue, said control system including an actuator member connected to said boom and a reel mounted on said second vehicle, said reel as operative to drive said actuator in response to said output signal of said detector.

9. The system of claim 8 and further comprising a plurality of said beacons mounted on both of said vehicles.

10. The system of claim 8 wherein the actuator, the boom and the body of said second vehicle form a triangular configuration.

11. The system of claim 8 wherein said boom is extensible from a retracted position to an extended position.

12. The system of claim 8 wherein said actuator comprises a rod slidably mounted in a sleeve, said rod being connected to said reel.

13. The system of claim 8 and further including a first universal joint connecting said actuator to said boom.

14. The system of claim 13 and further including a second universal joint connecting said boom to said second vehicle.

* * * * *